United States Patent
Park

(10) Patent No.: US 8,619,174 B2
(45) Date of Patent: Dec. 31, 2013

(54) METHOD AND APPARATUS FOR CONTROLLING A DISPLAY FOR IMAGE TRANSMISSION

(75) Inventor: Sung-ha Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 174 days.

(21) Appl. No.: 12/822,462

(22) Filed: Jun. 24, 2010

(65) Prior Publication Data

US 2011/0050977 A1 Mar. 3, 2011

(30) Foreign Application Priority Data

Aug. 25, 2009 (KR) .......................... 10-2009-0078840

(51) Int. Cl.
*H04N 5/222* (2006.01)
*H04N 5/225* (2006.01)

(52) U.S. Cl.
USPC ...................................... 348/333.13; 348/372

(58) Field of Classification Search
USPC .................. 348/207.99, 333.05, 333.13, 372, 348/333.1, 33.133, 376, 374; 713/300
See application file for complete search history.

(56) References Cited

U.S. PATENT DOCUMENTS

| | | | | |
|---|---|---|---|---|
| 6,067,171 A | * | 5/2000 | Yamada et al. | 358/406 |
| 6,947,181 B1 | * | 9/2005 | Sato | 358/400 |
| 7,124,308 B2 | * | 10/2006 | Shiiyama | 713/300 |
| 2003/0229813 A1 | * | 12/2003 | Shiiyama | 713/300 |

* cited by examiner

*Primary Examiner* — James Hannett
*Assistant Examiner* — Ahmed A Berhan
(74) *Attorney, Agent, or Firm* — Drinker Biddle & Reath LLP

(57) ABSTRACT

Provided are a method and apparatus for controlling a display for image transmission. The method of controlling a display for image transmission reduces the time required to select images to be transmitted and increases user convenience and efficiency by calculating the residual amount of battery power and the amount of image files or data that is capable of being transmitted based on the current amount of battery power. Some embodiments of the method and apparatus notify a user about the amount of image files or data that is capable of being transmitted based on the residual amount of battery power and indicate whether fewer image files need to be selected for transmission.

18 Claims, 6 Drawing Sheets

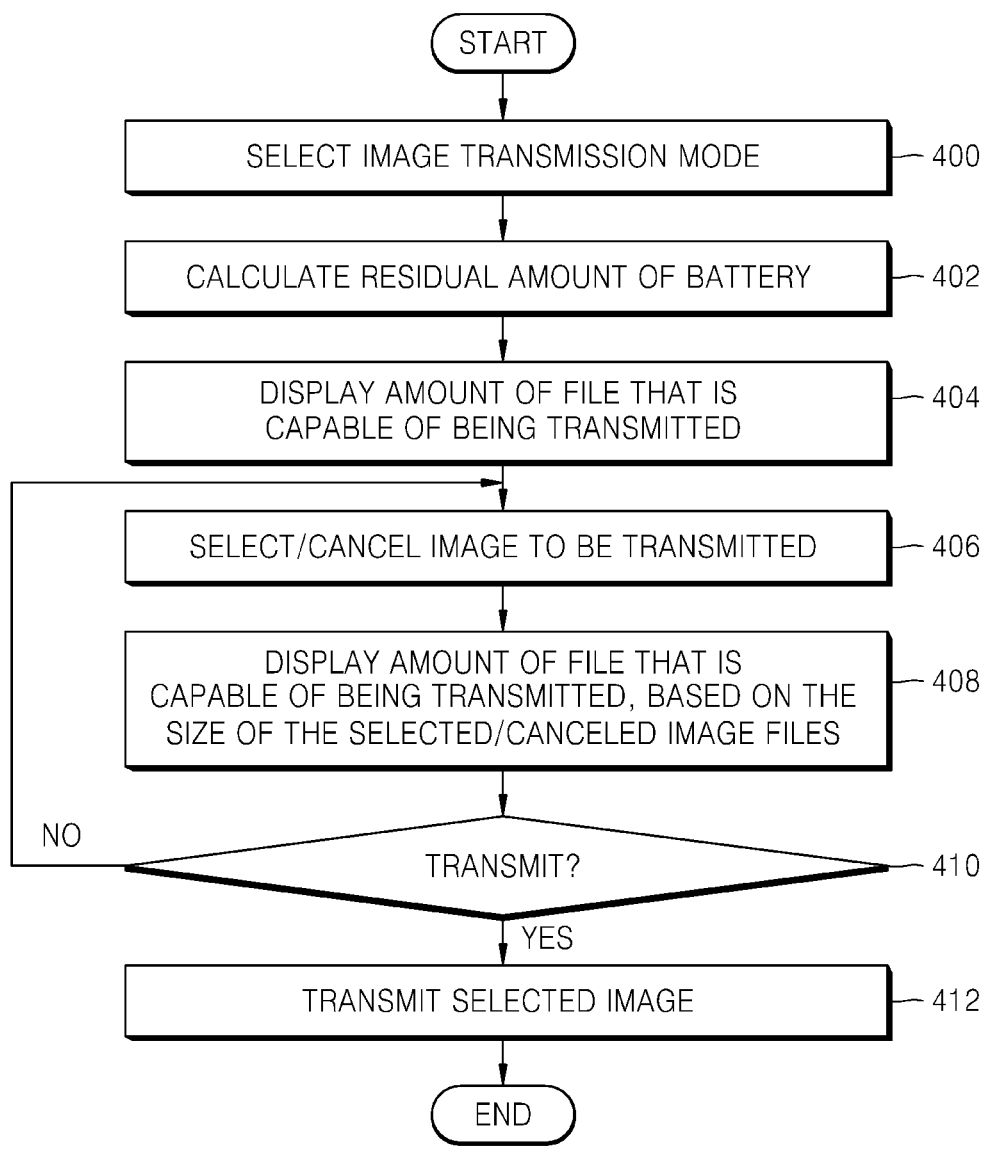

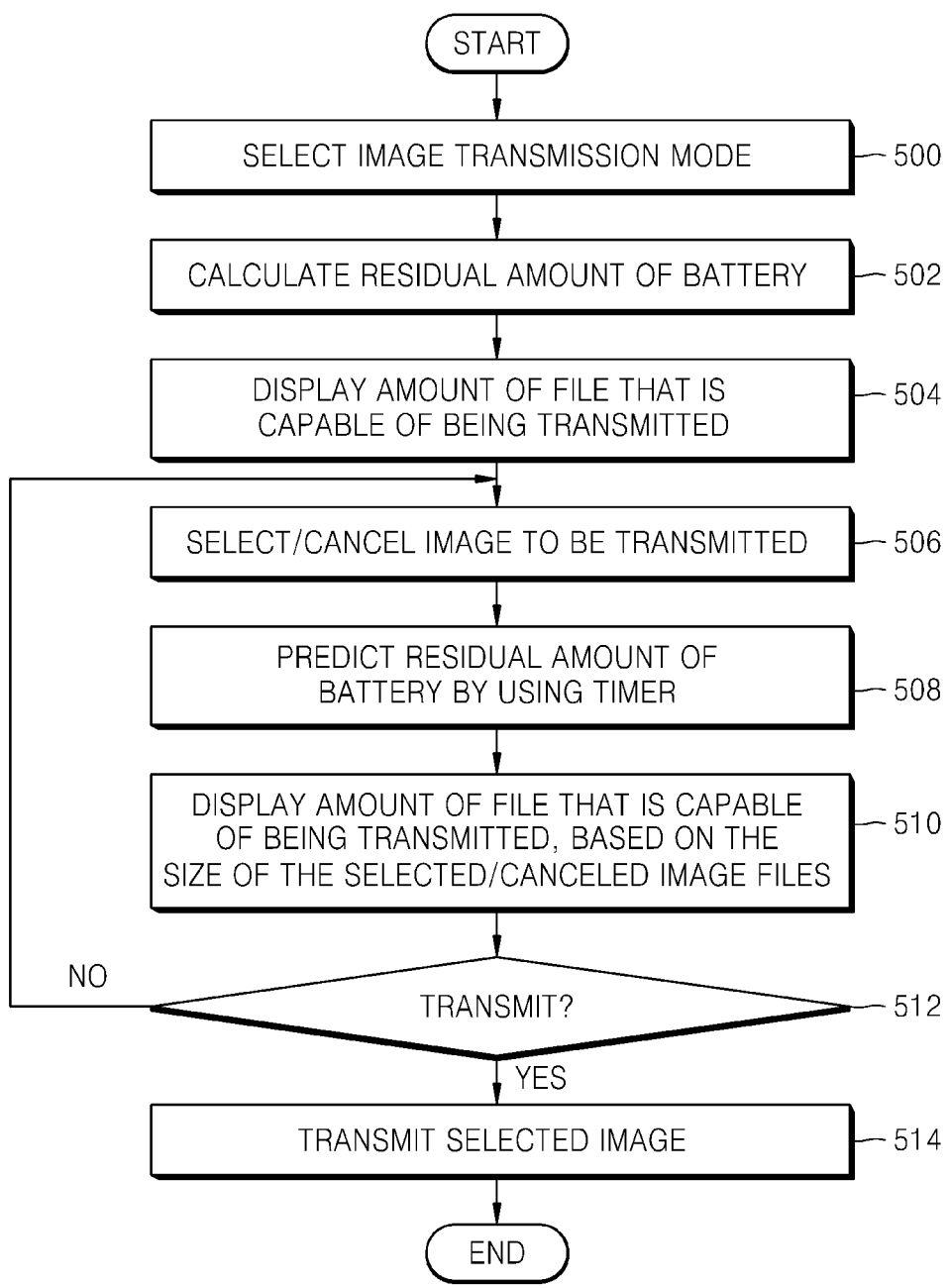

METHOD AND APPARATUS FOR CONTROLLING A DISPLAY FOR IMAGE TRANSMISSION

CROSS-REFERENCE TO RELATED PATENT APPLICATION

This application claims the benefit of Korean Patent Application No. 10-2009-0078840, filed on Aug. 25, 2009, in the Korean Intellectual Property Office, the disclosure of which is incorporated herein in its entirety by reference.

BACKGROUND

The present invention relates to a method and apparatus for controlling a display, and more particularly, to a method and apparatus for controlling a display for image transmission.

Recently, along with the development of wireless networks, technologies for directly or wirelessly uploading photos taken by digital photographing apparatuses have been developed. However, since a high amount of power is required to wirelessly transmit a high resolution image, image transmission may succeed or fail according to a residual amount of a battery of a digital photographing apparatus.

U.S. Pat. No. 6,947,181 discloses a technology for checking a residual amount of a battery when an image is transmitted, and transmitting data when image transmission is possible, or preventing the image transmission or transmitting only a thumbnail or a portion of the data when the full image transmission is not possible.

However, according to the technology, only after the residual amount of the battery has been checked and the image has been selected by the user it is determined whether image transmission is possible, and then only is it determined whether to transmit the image, a portion of the image, or only the thumbnail of the image. These determinations are performed after the user has selected one or more images to be transmitted, and thus the user may be inconvenienced by having to select one or more images that may not be transmitted.

SUMMARY

Provided are a method and apparatus for controlling a display for image transmission to reduce the time to select images to be transmitted and to maximize user convenience by calculating the amount of image files or data capable of being transmitted by the current residual amount of a battery of the digital photographing apparatus. Some embodiments notify a user about the amount of image files or data capable of being transmitted.

According to an embodiment of the present invention, there is provided a method of controlling a display for image transmission in a digital photographing apparatus, the method including calculating a residual amount of a battery of the digital photographing apparatus; calculating an amount of image files or data capable of being transmitted based on the residual amount of the battery; and displaying the amount of image files or data.

The method may further include changing and displaying the amount of image files or data capable of being transmitted, according to the amount of image files or data selected to be transmitted.

The method may further include subtracting the size of one or more image files selected or adding the size of deselected image files to the amount of image files or data capable of being transmitted; and displaying the amount of image files or data capable of being transmitted.

The method may further include, when the size of one or more image files selected by a user exceeds the amount of image files or data capable of being transmitted, warning that it is impossible to transmit the image files selected by the user.

The method may further include allowing a user to select or deselect image files to be transmitted or requesting for selection of image files to be transmitted or deselecting selected image files.

The method may further include displaying the total size or amount of selected image files together with the amount of image files or data capable of being transmitted, which is calculated by adding or subtracting the size or amount of the selected image files from the amount of image files or data capable of being transmitted.

The method may further include after the user selects an image file or deselects a selected image file, predicting a residual amount of the battery after a predetermined time measured by a timer elapses from the calculated residual amount of the battery, subtracting or adding the predicted residual amount of the battery from the amount of image files or data capable of being transmitted, respectively, according to the size or amount of the selected image files or the size or amount of the selected image files deselected, and displaying the amount of image files or data capable of being transmitted.

According to another embodiment of the present invention, there is provided an apparatus for controlling a display for image transmission, the apparatus including a battery residual amount calculator calculating a residual amount of a battery of the digital photographing apparatus; and a controller calculating an amount of image files or data capable of being transmitted based on the residual amount of the battery and controlling the display to display the amount of image files or data capable of being transmitted.

The controller may control the display to change and display the amount of image files or data capable of being transmitted, according to an amount of an image file to be transmitted.

The controller may subtract the size or amount of an image file selected or may add the size or amount of a selected image file deselected, from the amount of image files or data capable of being transmitted, and may control the display to display the amount of image files or data capable of being transmitted.

When the size or amount of an image file selected by a user exceeds the amount of image files or data capable of being transmitted, the controller may control the display to warn that it is impossible to transmit the image file selected by the user.

The controller may control the display to request for reselecting image files to be transmitted or deselecting of selected image files.

The controller may control the display to display the total size or amount of selected image files together with the amount of image files or data capable of being transmitted, which is calculated by subtracting the size or amount of an image file selected from and adding the size or amount of a selected image file deselected to the amount of image files or data capable of being transmitted.

After the user selects an image file or deselects a selected image file, the battery residual amount calculator may predict a residual amount of the battery after a predetermined time measured by a timer elapses from the calculated residual amount of the battery, and the controller may subtract or add the predicted residual amount of the battery from the amount of image files or data capable of being transmitted, respectively, according to the size or amount of the image file selected or the size or amount of the selected image file deselected, and displays the amount of image files or data capable of being transmitted.

According to another embodiment of the present invention, there is provided a computer readable recording medium having recorded thereon a program for executing the above described method.

BRIEF DESCRIPTION OF THE DRAWINGS

The above and other features and advantages of the present invention will become more apparent by describing in detail exemplary embodiments thereof with reference to the attached drawings in which:

FIG. 4 is a flowchart of a method of controlling a display for image transmission, according to another embodiment of the present invention; and FIG. 5 is a flowchart of a method of controlling a display for image transmission, according to another embodiment of the present invention.

DETAILED DESCRIPTION OF THE EMBODIMENTS

Reference will now be made in detail to embodiments, examples of which are illustrated in the accompanying drawings. Also, while describing the embodiments, detailed descriptions about related well-known functions or configurations that may diminish the clarity of the points of the embodiments of the present invention are omitted.

Terms or words used herein shall not be limited to having common or dictionary meanings, and have the meanings corresponding to technical aspects of the embodiments of the present invention so as to most suitably express the embodiments of the present invention.

Figure 1:
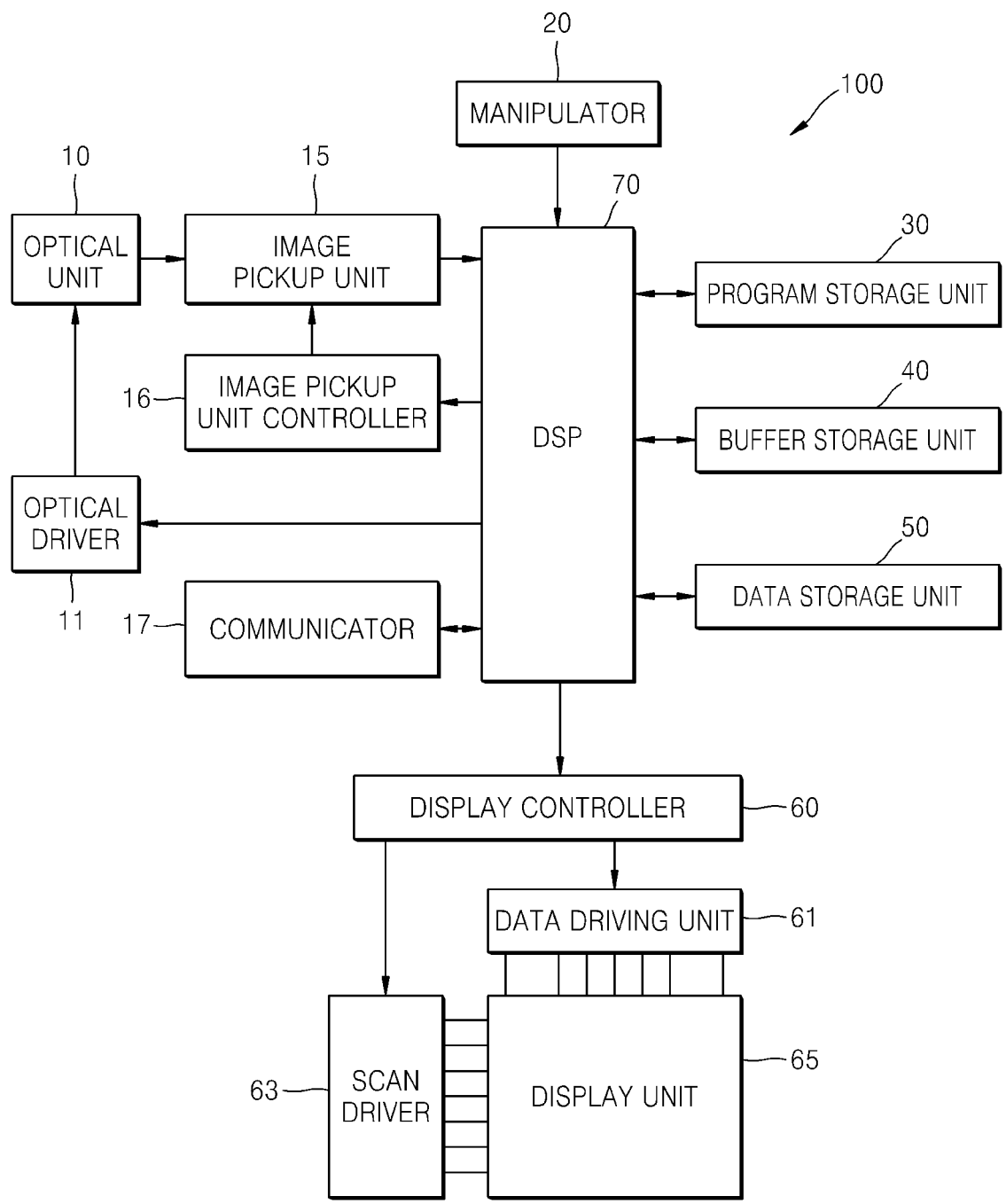
FIG. 1 is a block diagram of a digital photographing apparatus according to an embodiment of the present invention.

FIG. 1 is a block diagram of a digital photographing apparatus 100 according to an embodiment of the present invention.

Referring to FIG. 1, the digital photographing apparatus 100 includes an optical unit 10, an optical driver 11, an image pickup unit 15, an image pickup unit controller 16, a communicator 17, a manipulator 20, a program storage unit 30, a buffer storage unit 40, a data storage unit 50, a display controller 60, a data driving unit 61, a scan driver 63, a display unit 65 and a digital signal processor (DSP) 70.

The optical unit 10 receives an optical signal from a subject, and transmits the optical signal to the image pickup unit 15. The optical unit 10 may include at least one lens, such as a zoom lens for narrowing or widening a viewing angle according to a focal length, or a focus lens for adjusting focus on the subject. The optical unit 10 may further include an iris for adjusting light intensity.

The optical driver 11 may adjust a location of the at least one lens and the opening/closing of the iris. Focus may be adjusted by moving the location of the at least one lens, and light intensity may be adjusted by opening/closing the iris.

The optical driver 11 controls the optical unit 10 according to a control signal that is automatically generated by an image signal input in real time or that is manually input by a user.

The optical signal transmitted from the optical unit 10 to the image pickup unit 15 forms an image of the subject on a light-receiving surface of the image pickup unit 15. The image pickup unit 15 may include a charge-coupled device (CCD) or a complementary metal oxide semiconductor image sensor (CIS) that converts the optical signal into an electric signal. The image pickup unit controller 16 may adjust sensitivity of the image pickup unit 15. The image pickup unit controller 16 may control the image pickup unit 15 according to a control signal that is automatically generated by an image signal input in real time or that is manually input by the user.

The communicator 17 wirelessly transmits image files stored in a recording medium (not shown) to an external apparatus, according to control of the DSP 70. The external apparatus may be, for example, a digital media player, and may include, for example, a digital television (TV), a personal computer (PC), or a storage server. The communicator 17 may communicate with the external apparatus according to a predetermined wireless Internet protocol, for example, Wi-Fi.

The manipulator 20 may receive a control signal from outside the digital camera 100, such as from the user. The manipulator 20 may include a shutter-release button that can be pressed to generate a shutter-release signal to capture an image by exposing the image pickup unit 15 to light for a predetermined amount of time, a power supply button that can be pressed to power on the digital camera 100, a pantoscopic-zoom button and a telescopic-zoom button that can be pressed to widen or narrow a viewing angle, and various buttons that can be pressed to perform other functions, such as selecting a mode, such as a character inputting mode, a photographing mode, or a reproduction mode, selecting a white balance setting function, and selecting an exposure setting function. The manipulator 20 may include the various buttons as described above, but is not limited thereto, and may be realized in any of various forms that can be manipulated by the user, such as a keyboard, a touch pad, a touch screen, or a remote controller. The user may select an image transmission mode for transmitting images stored in the recording medium to the external apparatus, through the manipulator 20.

Also, the digital photographing apparatus 100 further includes the program storage unit 30 for storing programs such as an operating system, for operating the digital camera 100, and an application system, the buffer storage unit 40 for temporarily storing data required to perform operations or result data of the operations, and the data storage unit 50 for storing various types of information required for the stored programs and image files including image signals.

According to an embodiment of the present invention, in order to calculate a residual amount of a battery, the residual amount of the battery may be predicted with respect to a residual amount that has been previously measured, after a predetermined time measured by a timer elapses. In this case, data regarding power consumption for the image transmission mode may be stored in the buffer storage unit 40 or the data storage unit 50, and may be used to predict the residual amount of the battery. Here, the stored data is related to an average or maximum value of power consumption to perform operations in the image transmission mode, and power consumption required to operate in the image transmission mode while the user selects images to be transmitted.

Moreover, the digital photographing apparatus 100 includes the display controller 60 for displaying an operating status of the digital photographing apparatus 100 or an image captured by the digital photographing apparatus 100, the data driver 61 and the scanning driver 63 for transmitting display data received from the display controller 60, and the displayer 65 for displaying a predetermined image according to a signal received from the data driver 61 and the scanning driver 63. The displayer 65 may be formed of a liquid crystal display (LCD) panel, an organic light emitting display (OLED) panel, or an electrophoresis display (EPD) panel.

The DSP 70 will now be described in detail with reference to FIG. 2.

Figure 2:
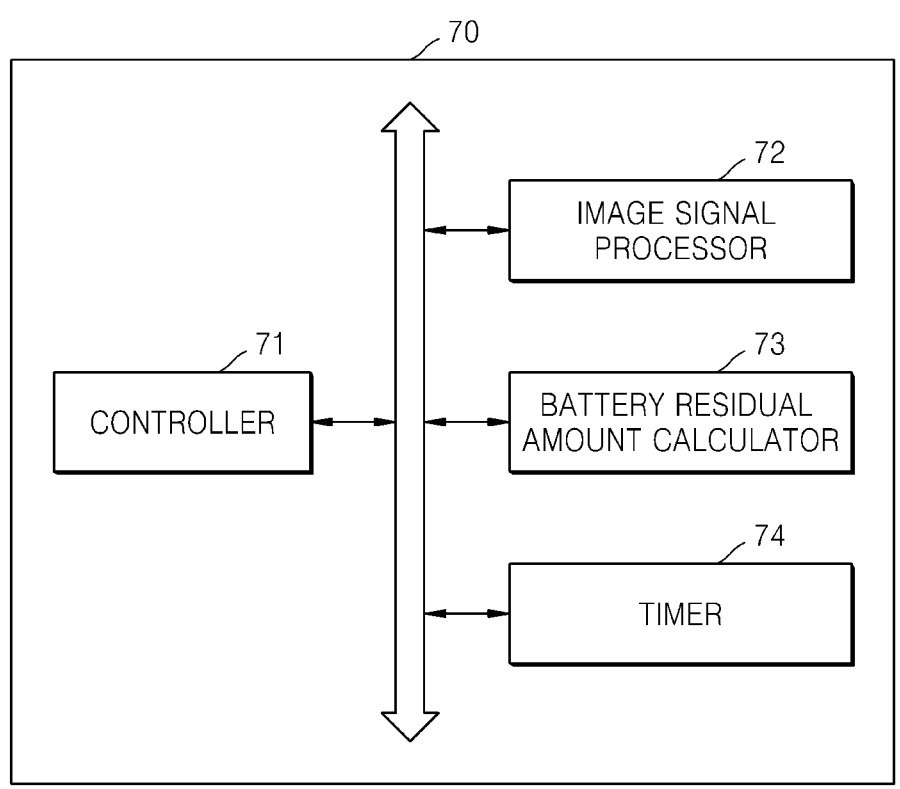
FIG. 2 is a block diagram illustrating in detail a digital signal processor (DSP) of FIG. 1, according to an embodiment of the present invention.

Referring FIG. 2, the DSP 70 includes a controller 71, an image signal processor 72, a battery residual amount calculator 73 and a timer 74. Here, the DSP 70 and a display controlling apparatus for transmitting an image recited in claims are understood to have the same meaning.

The controller 71 controls overall operations of the DSP 70.

The image signal processor 72 may convert an image signal received from the image pickup unit 15 into a digital signal, and performs an image signal process, such as gamma correction, color filter array interpolation, color matrix, color correction, or color enhancement, so that the image signal is converted according to the visual angle to a person. Also, the image signal processor 72 may perform an auto white balance algorithm or an auto exposure algorithm, when an auto white balance function or auto exposure function is set. The image signal processor 72 may generate an image file having a predetermined format by adjusting and compressing image data by using a scaler. Alternatively, the image signal processor 72 may decompress a compressed image file. The image signal processor 72 may perform the image signal process as described above on an image signal received in real time in a live-view mode before photographing, or an image signal received according to a shutter-release signal. Here, different image signal processes may be performed on the image signal.

The battery residual amount calculator 73 calculates the residual amount of the battery of the digital photographing apparatus 100. The battery may be a primary battery or a secondary battery, for example, a lithium-ion battery or a lithium-polymer battery. The controller 71 calculates an amount of image files or data capable of being transmitted using the residual amount of the battery calculated by the battery residual amount calculator 73. For example, when image files selected have a total file size of 3 megabytes (MB), power consumption taken to transmit 3 MB is calculated, and then the amount of image files or data capable of being transmitted by a current residual amount of the battery is calculated. Then, the controller 71 controls the displayer 65 to display the calculated amount of image files or data capable of being transmitted.

In other words, the controller 71 controls the displayer 65 to change and display the amount of image files or data capable of being transmitted, which may be based on the size or amount of image files or data to be transmitted. An image file to be transmitted is extracted from the recording medium according to a selection signal input from the user, and is displayed on the displayer 65, according to control of the controller 71. The displayed image may be a thumbnail image. In an embodiment a user may be allowed to select image files by selecting thumbnail images, filenames or other identifying data. The image file stored in the recording medium may include information regarding the size and amount of the image file stored in a header, as well as additional information, and may also include a joint photographic coding experts group (JPEG) image file and an original file. The controller 71 calculates battery consumption required to transmit the image file, based on the information regarding the size or amount of the image file stored in the header. The controller 71 subtracts the size or amount of an image file selected and adds the size or amount of a selected image file deselected to the number or amount of image files or data capable of being transmitted, and controls the displayer 65 to display the number, size or amount of image files or data capable of being transmitted. In an embodiment, the number or amount of image files or data capable of being transmitted is calculated by calculating battery consumption required to transmit images selected by the user or battery consumption saved when selected images are deselected by the user, calculating a current residual amount of the battery, and then adding the battery consumption saved or subtracting the battery consumption from the current residual amount of the battery.

In an embodiment, when the number, size or amount of one or more image files or data selected by the user exceeds the amount of image files or data capable of being transmitted, the controller 71 warns that it is impossible to transmit the one or more image files selected by the user. In an embodiment, the controller 71 may ask or prompt the user to select fewer images to be transmitted or to deselect some selected images. In addition, in an embodiment, the controller 71 displays the size, number or amount of image files selected by the user as well as the size, number or amount of image files or data capable of being transmitted on the displayer 65. In an embodiment, the displayed number or amount of files or data that is capable of being transmitted is based on the resolution, file size or other setting in the digital photographing apparatus.

In an embodiment, after an image file is selected or a selected image file is deselected by the user, the battery residual amount calculator 73 predicts a residual amount of the battery after a predetermined amount of time has elapsed, based on a residual amount of the battery calculated by the timer 74. A current residual amount of the battery is predicted by subtracting battery consumption according to a time required for the user to select an image file from a residual amount of the battery previously calculated. The controller 71 calculates the amount of image files or data capable of being transmitted, based on the predicted current residual amount of the battery, according to image files selected or selected image files deselected, and displays the amount of image files or data capable of being transmitted on the displayer 65.

FIGS. 3A through 3E are exemplary diagrams for explaining a method of controlling a display for image transmission in a digital photographing apparatus, according to an embodiment of the present invention.

Figure 3A:
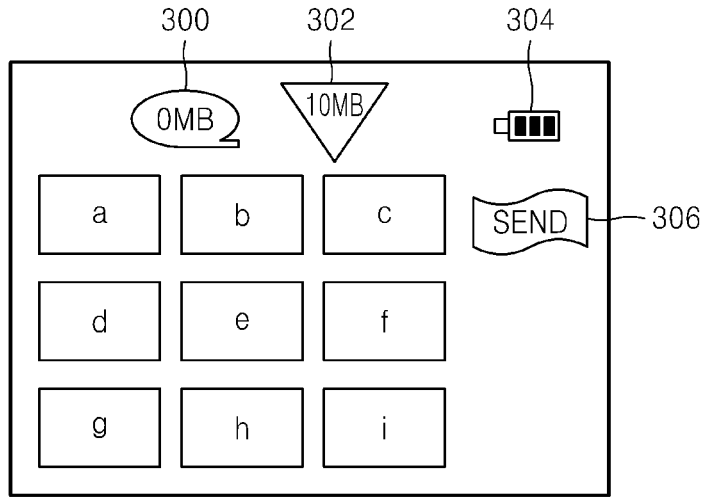
FIGS. 3A through 3E are exemplary diagrams for explaining a method of controlling a display for image transmission in a digital photographing apparatus, according to an embodiment of the present invention.

In FIG. 3A, images 'a' to 'i' to be selected in an image transmission mode by a user, a display icon 300 of the size or amount of image files to be transmitted, a display icon 302 of the amount of image files or data capable of being transmitted by a current residual amount of a battery, a display icon 304 of a residual amount of the battery, and an image transmitting icon or button 306 are illustrated. The images 'a' to 'i' are thumbnail images, and the number of images that may be selected is not limited. As illustrated in the embodiment shown in FIG. 3A, a total amount or number of image files capable of being transmitted by the current residual amount of the battery corresponds to 10 MB.

Figure 3B:
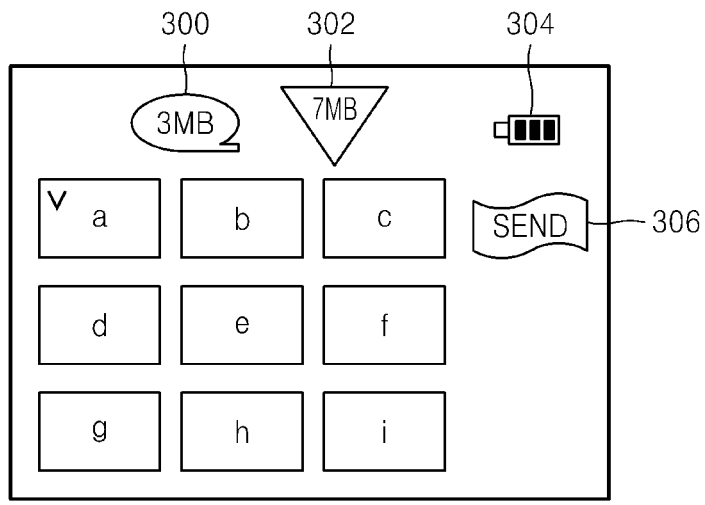

Referring to FIG. 3B, when the user selects the image 'a', the display icon 300 of the size or amount of image files to be transmitted displays 3 MB, and the display icon 302 of the amount of image files or data capable of being transmitted is changed from displaying 10 MB to displaying 7 MB.

Figure 3C:
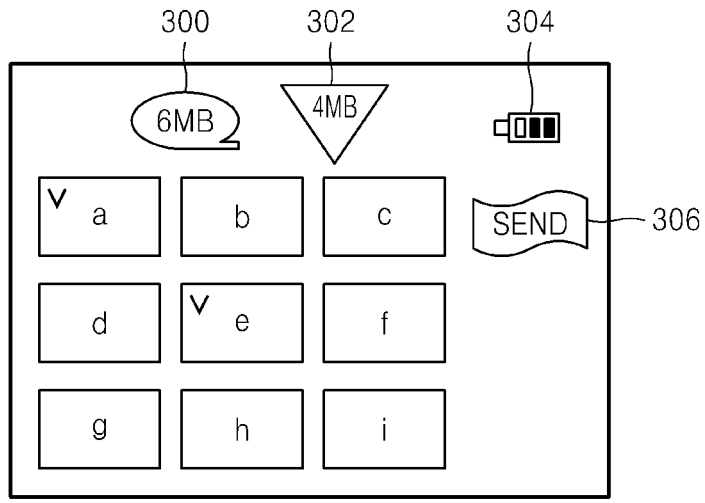

Referring to FIG. 3C, when the user selects the image 'e', the display icon 300 of the size or amount of image files to be transmitted displays 6 MB, and the display icon 302 of the amount of image files or data capable of being transmitted is changed from displaying 7 MB to displaying 4 MB. In an embodiment, if the size of one or more files selected by a user to be transferred is 6 MB, then 6 MB is subtracted from the number showing the amount of data that can be transferred after the selected files are transferred. In an embodiment, if a total of 10 MB of image data can be transferred with the remaining battery power, and two images totaling 6 MB are selected to be transferred by a user, then 4 MB (10 MB-6 MB) is displayed as the amount of data that can still be transferred after the selected images have been transferred. In such embodiment, if the user deselects one of the two images and the remaining selected image has a size of 3 MB, then 7 MB (10 MB-3 MB) is displayed as the amount of data that can still be transferred after the selected image has been transferred.

Figure 3D:
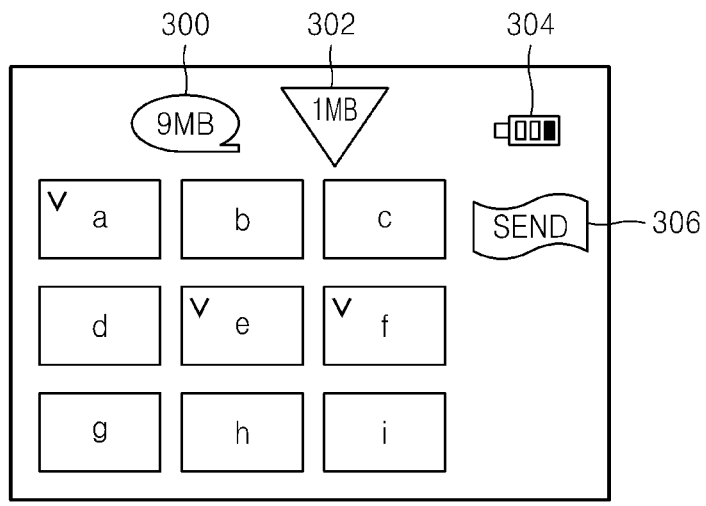

Referring to FIG. 3D, when the user selects the image 'f', the display icon 300 of the size or amount of image files to be transmitted displays 9 MB, and the display icon 302 of the amount of image files or data capable of being transmitted is changed from displaying 4 MB to displaying 1 MB.

Thus, the user may know whether an image is capable of being transmitted according to the current residual amount of the battery when the user selects the image, instead of when the user pushes the image transmitting button 306 after the user has selected images to be transmitted. Accordingly, a time required to select images to be transmitted may be reduced by removing the inconvenience of selecting images that may not be transmitted depending on the cases.

Figure 3E:
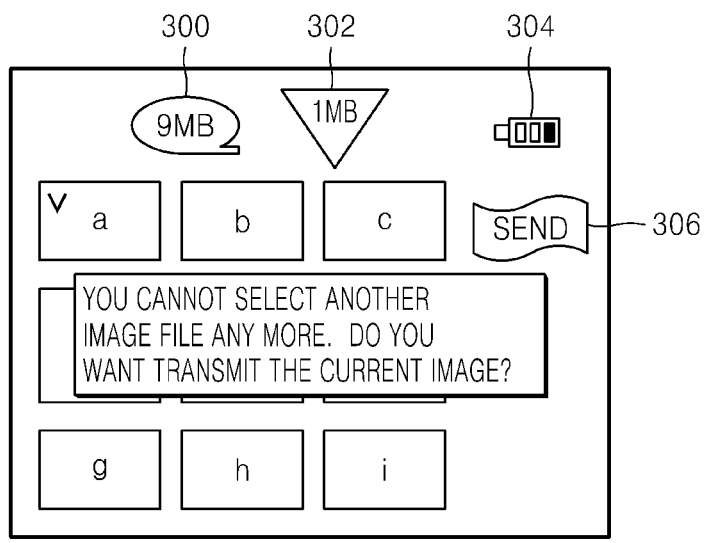

Referring to FIG. 3E, when the user selects an additional image, for example, the image 'd', the amount of image files or data that is capable of being transmitted is exceeded, and thus a warning or guidance message "you cannot select another image file. Do you want transmit the current images?" is displayed to the user. Alternatively, the user may be asked or prompted to select fewer images or change images selected by the user.

In the embodiments shown in FIGS. 3A through 3E, only the case where the amount of image files or data capable of being transmitted according to user's selection is reduced has been depicted. However, as described above, the amount of image files or data capable of being transmitted can also be increased by the size or amount of selected image files that are deselected by the user.

FIG. 4 is a flowchart of a method of controlling a display for image transmission, according to another embodiment of the present invention.

Referring to FIG. 4, in operation 400, a user selects an image transmission mode. In operation 402, a current residual amount of a battery is calculated. In operation 404, an amount of image files or data capable of being transmitted by the residual amount of the battery calculated in operation 402 is displayed. In operation 406, an image file to be transmitted may be selected and a selected image file may be deselected. In this case, the user selects at least one image file to be transmitted or deselects at least one selected image file. In operation 408, the size or amount of the image files selected by the user is subtracted from and the size or amount of the selected image files deselected by the user is added to the amount of image files capable of being transmitted, and then the amount of image files capable of being transmitted is displayed. In operation 410, the user selects image transmission. Then, in operation 412, the selected image files are transmitted.

FIG. 5 is a flowchart of a method of controlling a display for image transmission, according to another embodiment of the present invention.

Referring to FIG. 5, in operation 500, a user selects an image transmission mode. In operation 502, a current residual amount of a battery is calculated. When it is difficult to calculate the current residual amount of the battery, the current residual amount of the battery may be predicted with respect to a residual amount that has been previously measured, after a predetermined time measured by a timer elapses. In this case, data regarding power consumption for the image transmission mode may be stored in a memory, and may be used to predict the residual amount of the battery. In operation 504, an amount of image files or data capable of being transmitted by the current residual amount of the battery calculated in operation 502 is displayed. In operation 506, the image file to be transmitted is selected or canceled. In this case, the user selects at least one image or deselects at least one selected image. In operation 508, a residual amount of the battery is predicted, in which a timer is used. In this case, after the amount of image files capable of being transmitted is displayed, an amount of battery consumption for the user to select or deselect the image files to be transmitted is reflected in the amount of image files or data capable of being transmitted. Alternatively, when a variation in the residual amount of the battery exceeds the predetermined level, the variation may be reflected in the amount of image files or data capable of being transmitted.

In operation 510, the amount or size of image files selected by the user is subtracted from and the amount or size of the selected image files deselected by the user is added to the amount of image files or data capable of being transmitted that is displayed. In operation 512, the user selects image transmission, whereby the photographing apparatus receives a signal to transmit the selected images. Then, in operation 514, the selected image files are transmitted.

As described above, according to the one or more of the above embodiments of the present invention, with regard to image transmission of a digital photographing apparatus, a user may check an amount of image files that may be currently transmitted, and thus the user may know to not select image files that may not be transmitted, if necessary.

In addition, the user may check an amount of image files capable of being transmitted just after the user selects an image, and thus it is may be known whether additional images may be selected.

The invention can also be embodied as computer readable codes on a computer readable recording medium. The computer readable recording medium may be any data storage device that can store data which can be thereafter read by a computer system.

Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

What is claimed is:

1. A method of controlling a display in a digital photographing apparatus for image transmission, the method comprising:
    calculating a residual amount of a battery of the digital photographing apparatus;
    calculating an amount of image data capable of being transmitted based on the residual amount of the battery; and
    displaying the amount of image data capable of being transmitted,
    wherein calculating the amount of image data capable of being transmitted, and displaying the amount of image data capable of being transmitted are performed immediately after each single image of a plurality of images is selected or deselected.

2. The method of claim 1, further comprising:
    allowing for selection of image files to be transmitted; and
    changing the displayed amount of image data capable of being transmitted based on the size of the selected image files.

3. The method of claim 1, further comprising:
    allowing for selection and deselection of image files to be transmitted; and
    changing the displayed amount of image data capable of being transmitted by one of subtracting the size of the image files selected and adding the size of the image files deselected.

4. The method of claim 3, further comprising:
    displaying a total size of the image files selected.

5. The method of claim 3, further comprising:
    after selection of image files to be transmitted, calculating the amount of image data capable of being transmitted based on the size of the selected image files and the amount of time that has elapsed from when the residual amount of the battery was calculated.

6. The method of claim 1, further comprising:
    displaying a warning when a total size of the selected image files exceeds the amount of image data capable of being transmitted.

7. An apparatus for controlling a display for image transmission, the apparatus comprising:
    a battery residual amount calculator to calculate a residual amount of a battery of the apparatus; and
    a controller to calculate an amount of image data capable of being transmitted based on the residual amount of the battery, and control the display to display the amount of image data capable of being transmitted,
    wherein the controller is to calculate the amount of image data capable of being transmitted, and control the display of the amount of image data capable of being transmitted immediately after each single image of a plurality of images is selected or deselected.

8. The apparatus of claim 7, wherein the controller is to control the display to allow for selection of image files to be transmitted and to change the displayed amount of image data capable of being transmitted based on the size of the selected image files.

9. The apparatus of claim 8, wherein the controller is to control the display to display a warning when the size of the selected images files exceeds the amount of image data capable of being transmitted.

10. The apparatus of claim 8, wherein the controller is to control the display to request for one of reselection of image files to be transmitted or deselection of selected image files when the size of the selected images files exceeds the amount of image data capable of being transmitted.

11. The apparatus of claim 7, wherein the controller is to allow for selection and deselection of image files to be transmitted and changes the displayed amount of image data capable of being transmitted by one of subtracting the size of the image files selected and adding the size of the image files deselected.

12. The apparatus of claim 11, wherein the controller is to control the display to display a total size of the image files selected.

13. The apparatus of claim 7 further comprising:
    a timer measuring the time that has elapsed from when the residual amount of the battery was calculated, wherein the controller calculates the amount of image data capable of being transmitted based on the measured time.

14. A method of controlling a display in a digital photographing apparatus, the method comprising:
- determining a residual amount of a battery of the digital photographing apparatus;
- calculating one of an amount of image data capable of being transmitted and a number of image files capable of being transmitted based on the residual amount of the battery; and
- displaying one of the calculated amount of image data and the number of image files,
- wherein calculating the amount of image data capable of being transmitted, and displaying the amount of image data capable of being transmitted are performed immediately after each single image of a plurality of images is selected or deselected.

15. The method of claim 14, wherein the calculation of one of the amount of image data capable of being transmitted and the number of image files capable of being transmitted is based on an average value of power consumption required for transmitting data.

16. The method of claim 14, wherein the calculation of one of the amount of image data capable of being transmitted and the number of image files capable of being transmitted is based on the time that has elapsed from when the residual amount of the battery was calculated.

17. The method of claim 14, further comprising:
- allowing for selection and deselection of image files to be transmitted,
- wherein the calculation of one of the amount of image data capable of being transmitted and the number of image files capable of being transmitted is based on the size of image files selected to be transmitted.

18. The method of claim 14, further comprising:
- allowing for selection and deselection of image files to be transmitted,
- wherein if the size of the selected images files exceeds the amount of image data capable of being transmitted, displaying one of a warning, a prompt requiring deselection of image files to be transmitted and a prompt requiring reselection of image files to be transmitted.

* * * * *